United States Patent
Allred

(10) Patent No.: US 10,343,612 B1
(45) Date of Patent: Jul. 9, 2019

(54) SEAT COVER WITH LOAD BEARING ELEMENTS

(71) Applicant: Truck Shields, LLC, Salt Lake City, UT (US)

(72) Inventor: Jared Keith Allred, Kaysville, UT (US)

(73) Assignee: Truck Shields, LLC, Salt Lake City, UT (US)

( * ) Notice: Subject to any disclaimer, the term of this patent is extended or adjusted under 35 U.S.C. 154(b) by 57 days.

(21) Appl. No.: 15/796,800

(22) Filed: Oct. 29, 2017

(51) Int. Cl.
*B60R 7/04* (2006.01)
*B60N 2/60* (2006.01)
*B60R 11/00* (2006.01)
*F41A 23/26* (2006.01)

(52) U.S. Cl.
CPC ............... *B60R 7/043* (2013.01); *B60N 2/60* (2013.01); *B60R 2011/0015* (2013.01); *B60R 2011/0059* (2013.01); *B60R 2011/0071* (2013.01); *F41A 23/26* (2013.01)

(58) Field of Classification Search
CPC ... B60R 7/043; B60R 7/14; B60R 2011/0015; B60R 2011/0017; F41A 23/26; Y10T 24/316; Y10T 24/318
USPC ............. 297/188.04, 218.5, 228.1; 224/275
See application file for complete search history.

(56) References Cited

U.S. PATENT DOCUMENTS

| | | | | |
|---|---|---|---|---|
| 4,232,898 A | * | 11/1980 | Bodrero | B60N 2/6027 297/224 |
| 4,302,046 A | * | 11/1981 | Lazazzero | A47C 7/62 224/275 |
| 6,279,799 B1 | * | 8/2001 | Horton | B60R 7/14 211/64 |
| 6,345,866 B1 | | 2/2002 | Jackson | |
| 6,405,909 B1 | * | 6/2002 | Burnett | B60R 7/043 211/64 |
| 2007/0257072 A1 | * | 11/2007 | Pena | F41C 23/02 224/150 |
| 2009/0283562 A1 | * | 11/2009 | Podschus | A61G 1/06 224/572 |
| 2011/0309123 A1 | * | 12/2011 | Ashenafi | A45F 3/14 224/627 |
| 2014/0151413 A1 | * | 6/2014 | Ponder | F41C 33/007 224/149 |

FOREIGN PATENT DOCUMENTS

EP  2848464  3/2015

* cited by examiner

*Primary Examiner* — Kristina N Junge
(74) *Attorney, Agent, or Firm* — Austin Rapp

(57) ABSTRACT

An apparatus for covering a seat may have a seat cover that may be positioned in an installed configuration. The apparatus may further comprise a load bearing element comprising a flexible strap attached to the seat cover. A first anchoring mechanism may attach to the flexible strap at a first inflection point of the flexible strap. A central load support mechanism may attach to the flexible strap at a second inflection point of the flexible strap. A second anchoring mechanism may attach to the flexible strap at a third inflection point of the flexible strap. In the installed configuration, the first anchoring mechanism attaches to a first headrest column and the second anchoring mechanism attaches to a second headrest column.

13 Claims, 4 Drawing Sheets

SEAT COVER WITH LOAD BEARING ELEMENTS

TECHNICAL FIELD

The present invention relates generally to vehicle seating. More specifically, the present invention relates to a seat cover with load bearing elements.

BACKGROUND

The seating in a vehicle is critical to the comfort of its occupants. Many different materials, including natural fabrics, synthetic fabrics, polymers, leather, and the like may be used to upholster vehicle seating. Such materials can be subject to a variety of conditions, including high and low temperatures, direct sunlight, spilled or dropped food or drinks, and the like. Accordingly, it is not uncommon for vehicle seating to become worn, stained, damaged, or otherwise impaired after a period of use.

Seat covers can help to restore the look and/or feel of vehicular seating without the need to reupholster or replace worn seating. Many types of seat covers exist. Unfortunately, known seat covers are limited in many respects.

More specifically, many known seat covers are not able to support a load. For example, due to limited storage space in a vehicle, it may be desirable to store cargo (e.g., backpacks, tools, bins, bags, lumber, etc.) on the back of a seat. However, known seat covers may lack structural strength to support a load.

Accordingly, for these and other reasons, improved apparatuses and methods for a seat cover with load bearing elements are desirable.

SUMMARY

Embodiments of the disclosed subject matter are provided below for illustrative purposes and are in no way limiting of the claimed subject matter.

An apparatus for covering a seat of a vehicle is described. The apparatus includes a seat cover having an installed configuration. The seat cover may include a rear backrest panel and an upward backrest panel having one or more openings to permit headrest columns to pass through the upward backrest panel when the seat cover is in the installed configuration.

The apparatus also includes a load bearing element having a flexible strap, which, in the installed configuration, may be configured as indicated in the remainder of this paragraph. A first end of the flexible strap may attach to a first attachment point on the seat cover and a second end of the flexible strap may attach to a second attachment point on the seat cover. In various embodiments, the first and second attachment points may be on the rear backrest panel, which may comprise one or more positioning straps. The load bearing element also includes a first anchoring mechanism configured to attach to the flexible strap at a first inflection point between a first segment and a second segment of the flexible strap. The load bearing element further includes a central load support mechanism configured to attach to the flexible strap at a second inflection point between the second segment and a third segment of the flexible strap. The load bearing element further includes a second anchoring mechanism configured to attach to the flexible strap at a third inflection point between the third segment and a fourth segment of the flexible strap. The first anchoring mechanism may attach to a first headrest column and the second anchoring mechanism may attach to a second headrest column.

The central load support mechanism may be a hook. In the installed configuration, the anchoring mechanisms may transfer a load on the central load support mechanism to the headrest columns. The anchoring mechanisms may be slidably attached to the flexible strap.

In the installed configuration, a longitudinal axis of the first segment may be disposed at an acute angle with respect to a longitudinal axis of the second segment at the first inflection point. A longitudinal axis of the second segment may be disposed at an acute angle with respect to a longitudinal axis of the third segment at the second inflection point. A longitudinal axis of the third segment may be disposed at an acute angle with respect to a longitudinal axis of the fourth segment at the third inflection point.

The rear backrest panel may include a first loop attached at the first attachment point and a second loop attached at the second attachment point. In the installed configuration, the first end of the flexible strap may attach to the first loop and the second end of the flexible strap may attach to the second loop.

In the installed configuration, the flexible strap may be attached to the rear backrest panel on an interior side of the rear backrest panel. The rear backrest panel may include an opening for the central load support mechanism to pass through to an exterior side of the rear backrest panel.

The apparatus may also include a first peripheral support strap attached to the rear backrest panel at the first attachment point and a second peripheral support strap attached to the rear backrest panel at the second attachment point. The peripheral support straps may each be a single strap forming a loop. The peripheral support straps may be adjustable in length to accommodate a load distributed between the peripheral support straps.

The rear backrest panel may include an opening at the first attachment point for the first peripheral support strap to pass through to an exterior side of the rear backrest panel and an opening at the second attachment point for the second peripheral support strap to pass through to the exterior side of the rear backrest panel.

Thus, embodiments of the disclosed subject matter provide simple and effective seat coverage that may be used to support loads on a wide variety of vehicle seating.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

Figure 1:
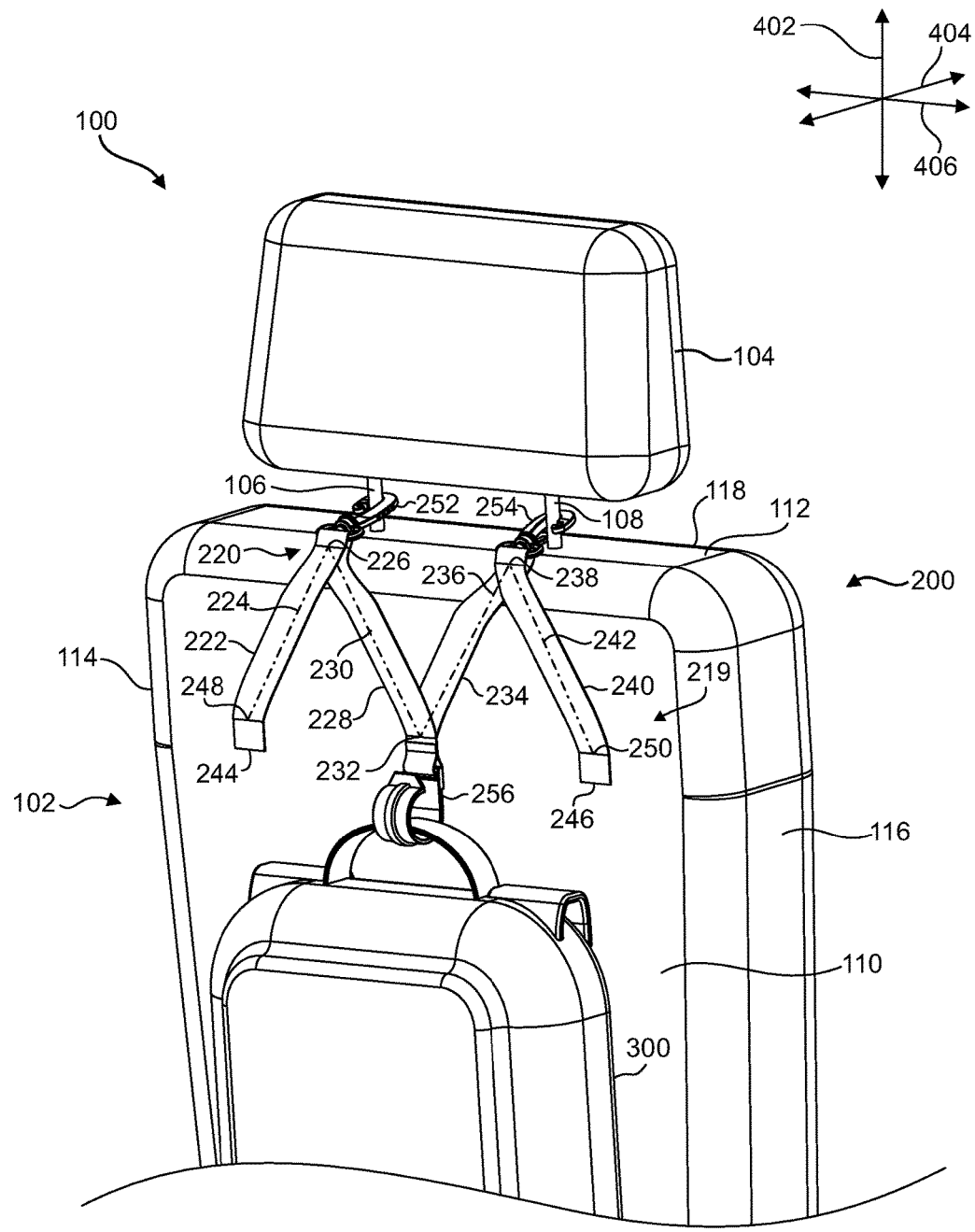
FIG. 1 is a rear, perspective view illustrating a seat of a vehicle, with an apparatus according to one embodiment of the invention.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

The word "exemplary" is used exclusively herein to mean "serving as an example, instance, or illustration." Any embodiment described herein as "exemplary" is not necessarily to be construed as preferred or advantageous over other embodiments, but simply refers to one or more embodiments of the invention. While the various aspects of the embodiments are presented in drawings, the drawings are not necessarily drawn to scale unless specifically indicated.

As used in this application, the phrases "an embodiment" or "in one embodiment" or the like do not refer to a single, specific embodiment of the disclosed subject matter. Instead, these phrases signify that the identified portion or portions of the disclosed subject matter may be combined with other aspects of the disclosure without limitation.

For this application, the phrases "connected to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The terms "integrally formed" refer to a body that is manufactured integrally, i.e., as a single piece, without requiring the assembly of multiple pieces. Multiple parts may be integrally formed with each other if they are formed or machined from a single workpiece.

As used herein, in various embodiments, the term "offset" when used to identify a relative position of items, features or components along a designated axis, in various embodiments, signifies that the center points of each of the two identified items are offset along the designated axis. This type of offset relationship may be referred to as "center point offset." In alternative embodiments, the term "offset" may be used to signify that the outer boundaries of two items do not overlap along a designated axis. This type of offset relationship may be referred to as "outer boundary offset."

As used herein, the term "generally" indicates that a particular item is within 5°, 10°, or 15° of a specified orientation or value. As used herein, the term "substantially" indicates that a particular value is within 5%, 10% or 15% of a specified value.

As used herein, the term "panel" or "panels" signifies a portion of a seat cover that may be integral with, separate from, abutting but unsecured to, or secured to one or more surrounding portions of the seat cover. The panel may be comprised of one or more elements that are physically discrete, integrally formed, or mutually secured.

In one embodiment, the phrases "substantially cover" or "substantially covers" signifies covering at least 70% of the identified area. In alternative embodiments, these terms signify covering at least 50%, 60%, 80%, 90% or 95% of the identified area. The term "entirely covers" or "entirely cover" signify that the entire identified area is covered.

A "flexible connector" includes any flexible structure capable of securing two objects together. Thus, a flexible connector may include, for example, a strap, string, cord, elastic band, or the like. A flexible connector may be formed of any material that provides the necessary flexibility, included but not limited to natural fabrics, synthetic fabrics, polymers, elastomers, and combinations thereof. A "strap" is a type of flexible connector.

The terms "proximal" and "distal" generally refer to parts or regions that are, respectively, closer to or further from the center of an object or system. A "proximal end" of an object may be the end that is maintained closer to the body of a user or a larger object to which the first object is coupled. Conversely, a "distal end" of an object may be the end that is maintained further from the body of a user or a larger object to which the first object is coupled.

An "anchoring element" is any structure that serves to anchor two other items together. Anchoring elements can use any known attachment scheme, including but not limited to various forms of mechanical fastening, which may include sewing, use of a loop or ring, a hook and loop system (e.g., Velcro®), welding, use of an adhesive or chemical bonding, and the like.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

Figure 2:
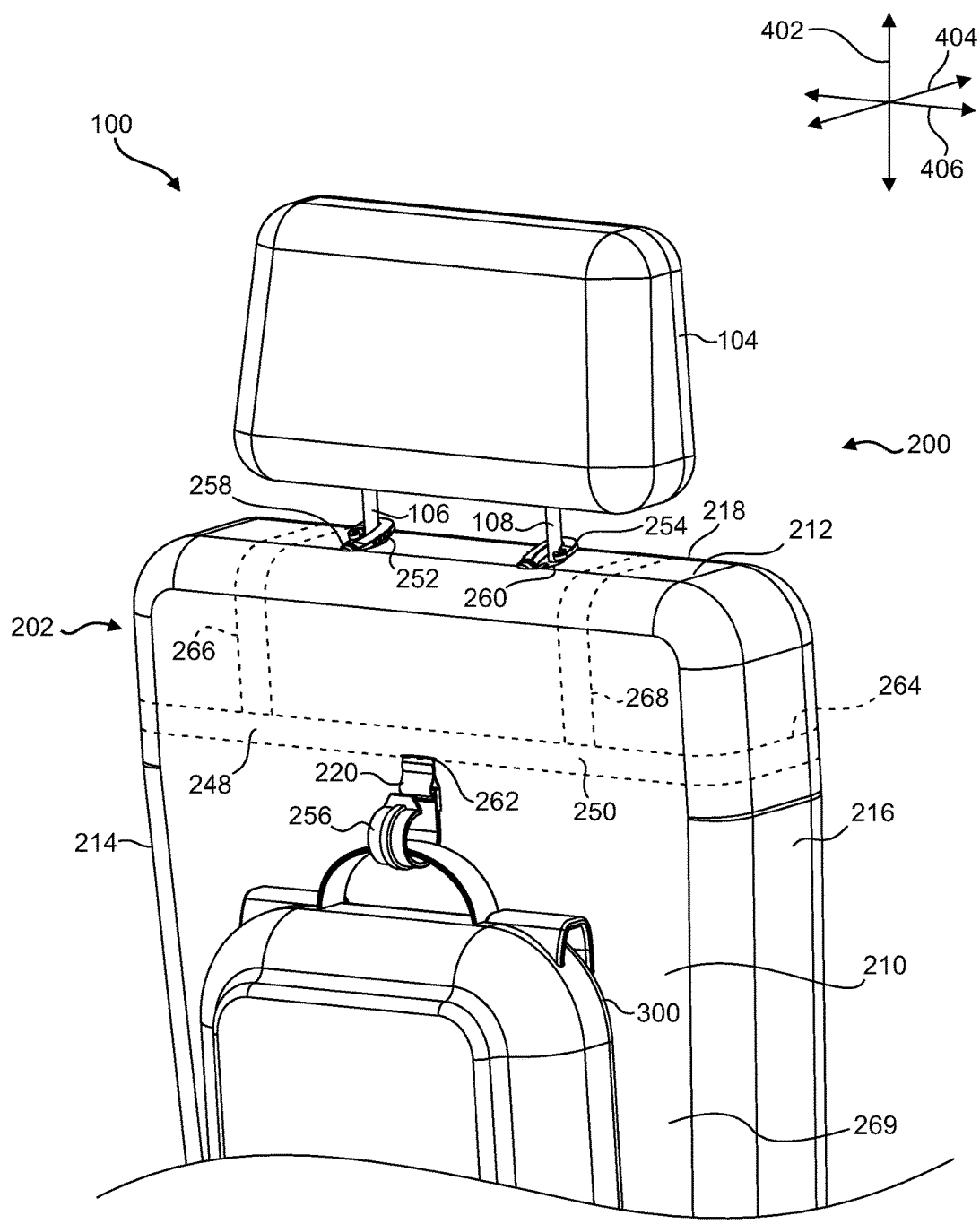
FIG. 2 is a rear, perspective view illustrating the seat and apparatus of FIG. 1 with a seat cover in an installed configuration.

Referring to FIG. 1 and FIG. 2, a rear, perspective view illustrates a seat 100 of a vehicle, with an apparatus 200 according to one embodiment of the invention. The apparatus 200 may include a seat cover 202 and a load bearing element 219 positioned on the seat 100. It should be noted, that for clarity, FIG. 1 does not show the seat cover 202. FIG. 2 shows the apparatus 200 with the seat cover 202 in an installed configuration.

The seat 100 may be in any type of vehicle, including but not limited to automobiles, commercial trucking, recreation vehicles, all-terrain vehicles (ATVs), planes, trains, boats, or the like. In one or more embodiments, the seat 100 may be a bucket seat sized to accommodate a single person. In various alternative embodiments, the seat 100 may be a bench seat sized to accommodate multiple people.

Relative to the seat 100, the words "forward," "rearward" "upward," and "lateral" may be used. These words may relate to the position of one or more passengers relative to the seat 100. More specifically, a "forward" or "forward-facing" member or surface may be one that is oriented toward the direction in which the passenger faces, or faces the same direction as the passenger. By the same token, a "rearward" or "rearward-facing" member or surface may be one that is oriented away from the direction in which the passenger faces, or faces a direction opposite to the direction in which the passenger faces. An "upward" or "upward-facing" member or surface may be one that is oriented upward relative to the passenger's body, or that faces toward a space above the passenger. A "lateral" or "lateral-facing" member or surface may be one that is oriented to the left or right side or that faces leftward or rightward relative to the passenger's body. For clarity, a height axis 402, a depth axis 404 and a width axis 406 are illustrated.

The various components of the seat 100 will now be set forth. Parts of the seat 100 that are covered, for example, by the apparatus 200, are indicated by phantom lines in the drawings.

The seat 100 may have a support member (not shown) and a backrest member 102. The support member may be the portion of the seat 100 on which one or more passengers typically sit, and may face generally upward. The passenger may recline against the backrest member 102; thus, the backrest member 102 may be positioned generally rearward of the passenger.

The backrest member 102 may have a forward-facing backrest member surface 118 against which the passenger reclines, a first laterally-facing backrest member surface 114 facing to the passenger's left, a second laterally-facing backrest member surface 116 facing to the passenger's right, a rearward-facing backrest member surface 110 facing rearward, and an upward-facing backrest member surface 112.

The seat 100 may also have one or more headrests 104, which may extend upward from the upward-facing backrest member surface 112 of the backrest member 102. A headrest 104 may be supported by one or more headrest columns. For example, a headrest 104 may be supported by a first headrest column 106 and a second headrest column 108.

The apparatus 200 may be used to cover the seat 100. The apparatus 200 may include a seat cover 202 with an installed configuration in which the seat cover 202 is secured to the seat 100 to cover at least portions of the various components of the backrest member 102. In the installed configuration, the seat cover 202 may also (optionally) generally cover various components of the support member. The apparatus 200 may also include a load bearing element 219 that supports one or more loads 300.

In the installed configuration, the seat cover 202 may be positioned over the seat 100. More specifically, in order to bring the apparatus 200 to the configuration shown in FIG. 1 and FIG. 2, the seat cover 202 may be positioned on the seat 100 and the rear backrest panel 210 may be positioned over at least a portion of the upward-facing backrest member surface 112 of the seat 100 and positioned to rest on at least a portion of the rearward-facing backrest member surface 110. The upward backrest panel 212 may rest on at least a portion of the upward-facing backrest member surface 112.

The seat cover 202 may have various components that correspond to and/or are shaped to cover the components of the backrest member 102. The seat cover 202 may include a rear backrest panel 210 that substantially or partially covers the rearward-facing backrest member surface 110. The seat cover 202 may also include an upward backrest panel 212 that substantially or partially covers an upward-facing backrest member surface 112. The seat cover 202 may further include a forward backrest panel 218 that substantially or partially covers the forward-facing backrest member surface 118, a first lateral backrest panel 214 that substantially or partially covers the first laterally-facing backrest member surface 114, and a second lateral backrest panel 216 that substantially or partially covers the second laterally-facing backrest member surface 116.

The rear backrest panel 210, the upward backrest panel 212, the first lateral backrest panel 214, the second lateral backrest panel 216, and the forward backrest panel 218 of the seat cover 202 may cooperate to define a backrest recess within which the backrest member 102 of the seat 100 may be at least partially positioned. The region within the backrest recess may be referred to as the interior of the seat cover 202. The region outside the backrest recess may be referred to as the exterior of the seat cover 202.

The upward backrest panel 212 may have one or more openings (e.g., holes) to permit the headrest columns to pass through the upward backrest panel 212 and into the upward-facing backrest member surface 112 of the seat 100. In the embodiment depicted in FIG. 2, the upward backrest panel 212 may have an opening 258 through which the first headrest column 106 passes and another opening 260 through which the second headrest column 108 passes. In various alternative embodiments, the upward backrest panel 212 may have a single opening through which both headrest columns 106, 108 may pass.

The apparatus 200 also includes a load bearing element 219. In various embodiments, the load bearing element 219 may include a flexible strap 220. In some embodiments, the flexible strap 220 may be a synthetic fiber (e.g., nylon, polyester) webbing. In other embodiments, the flexible strap 220 may be a canvas strap. Other types of materials may also be used for the flexible strap 220. In yet other embodiments, the flexible strap 220 may be a rope.

The flexible strap 220 may attach to the seat cover 202 and, in various embodiments, to the rear backrest panel 210 of the seat cover 202. The flexible strap 220 may have a first end 244 and a second end 246. In the installed configuration, the first end 244 of the flexible strap 220 may attach to a first attachment point 248 on the seat cover 202, and, in various embodiments, to the rear backrest panel 210 of the seat cover 202. The second end 246 of the flexible strap 220 may attach to a second attachment point 250 on the seat cover 202, and, in various embodiments, to the rear backrest panel 210 of the seat cover 202.

In various embodiments, the first attachment point 248 and the second attachment point 250 may be at the same height on the rear backrest panel 210 in the installed configuration relative to a height axis 402. However, the first attachment point 248 and the second attachment point 250 may be separated by a distance along a width axis 406. In various embodiments, the separation between the first attachment point 248 and the second attachment point 250 may be such that the first attachment point 248 is outside the first headrest column 106 and the second attachment point 250 is outside the second headrest column 108 along the width axis 406.

In the installed configuration, the flexible strap 220 may be attached to the rear backrest panel 210 on an interior side of the rear backrest panel 210. In other words, the flexible strap 220 may attach to the rear backrest panel 210 between the rear backrest panel 210 and the rearward-facing backrest member surface 110 of the seat 100. When the flexible strap 220 is installed on the interior side of the rear backrest panel 210, the flexible strap 220 may be protected from damage (e.g., from dirt and debris) and from unintentional misalignment (e.g., from being bumped by a passenger in a vehicle).

In various embodiments, the first end 244 and/or the second end 246 of the flexible strap 220 may be attached directly to the rear backrest panel 210 at the first attachment point 248 or the second attachment point 250, respectively. For example, the second end 246 of the flexible strap 220 may be sewn (i.e., stitched) to the rear backrest panel 210 at the second attachment point 250. In other embodiments, the first end 244 and/or the second end 246 of the flexible strap 220 may be pivotally attached to the rear backrest panel 210 via one or more mechanical couplings that permit rotation.

In one or more alternative embodiments, the first end 244 and/or the second end 246 of the flexible strap 220 may be removably or fixedly attached to the rear backrest panel 210 at the first attachment point 248 and/or the second attachment point 250, respectively. For example, a loop (e.g., a D-loop) or ring may be affixed (e.g., sewn) to the rear backrest panel 210 at the first attachment point 248. The first end 244 of the flexible strap 220 may connect to the loop (shown in detail in FIG. 3) at the first attachment point 248. The first end 244 of the flexible strap 220 may wrap through this loop. The first end 244 of the flexible strap 220 may have a fastener that can be fastened at one or more locations along the length of the flexible strap 220. Such fasteners may include hook and loop fastening systems, adjustable belts, buckles, clasps, adjustable clips, and the like.

In an embodiment of FIGS. 1 and 2, a hook and loop fastening system (e.g., Velcro®) may be used to connect the first end 244 of the flexible strap 220 to a loop attached at the first attachment point 248 of the rear backrest panel 210. The flexible strap 220 may include the hook and loop fastening system at the first end 244. The hook and loop fastening system may include a hook end portion and a loop end portion on the flexible strap 220. The hook end portion may have a series of small, flexible hooks that engage corresponding flexible loops of the loop end portion. The hook end portion may be easily detached from the loop end portion and shifted to a different location on the loop end portion of the flexible strap 220 for re-attachment, thereby increasing or decreasing the length of the flexible strap 220. Tightening the flexible strap 220 may entail detaching the hook end portion from the loop end portion, drawing the hook end portion further through the loop at the first attachment point 248, and then re-attaching the hook end portion to the loop end portion of the flexible strap 220. A similar hook and loop system could also be used to attach the second end 246 of the flexible strap 220 to the second attachment point 250. In various alternative embodiments, alternative connection mechanisms may be employed to connect the first end 244 of the flexible strap 220 at the first attachment point 248, such as a set of interlocking loops or a single loop with a snap hook or clasp.

The load bearing element 219 may also include a first anchoring mechanism 252 and a second anchoring mechanism 254 configured to attach to the flexible strap 220. The first anchoring mechanism 252 and the second anchoring mechanism 254 may be configured to attach to the first headrest column 106 and the second headrest column 108, respectively. For example, the first anchoring mechanism 252 and the second anchoring mechanism 254 may be a hook, ring or loop that attaches to the headrest columns 106, 108.

The first anchoring mechanism 252 and the second anchoring mechanism 254 may be configured to slidably attach to the flexible strap 220. For example, the first anchoring mechanism 252 and the second anchoring mechanism 254 may each include a ring or loop that allows the flexible strap 220 to pass through. In various embodiments, the first anchoring mechanism 252 and the second anchoring mechanism 254 may each be a swivel, snap hook or clasp that attaches to a headrest column and includes a loop through which the flexible strap 220 may pass through.

The load bearing element 219 may also include a central load support mechanism 256. In various embodiments, the central load support mechanism 256 may be a hook or curved post that is configured to support the weight of a load 300. For example, the central load support mechanism 256 may be configured as a hook that accommodates a backpack strap.

The central load support mechanism 256 may attach to the flexible strap 220. In various embodiments, the central load support mechanism 256 may be slidably attached to the flexible strap 220. For example, the central load support mechanism 256 may include a loop through which the flexible strap 220 may pass. In various alternative embodiments, the central load support mechanism 256 may be attached directly (e.g., sewn) to the flexible strap 220.

In various embodiments, the rear backrest panel 210 may include an opening 262 for the central load support mechanism 256 to pass through to an exterior side of the rear backrest panel 210. For example, in the installed configuration, the central load support mechanism 256 may pass from the interior side of the rear backrest panel 210 to the exterior side through the opening 262. In various embodiments, the opening 262 may be a button-type hole sized to allow a hook to pass through. The opening 262 may restrict movement of the central load support mechanism 256 in lateral dimensions, thus keeping the central load support mechanism 256 in position.

In the installed configuration, the flexible strap 220 may have four segments. The flexible strap 220 may include a first segment 222, a second segment 228, a third segment 234 and a fourth segment 240. It should be noted that these four segments are used to describe the geometry of the flexible strap 220 in the installed configuration and, in various embodiments, do not constitute separate physical parts of the flexible strap 220. In other words, the four segments 222, 228, 234, 240 may be integrally formed. In various alternative embodiments, the segments 222, 228, 234, 240 may be physically discrete components joined together.

In the installed configuration, the first segment 222 and the second segment 228 may form a first inflection point 226 where the first anchoring mechanism 252 attaches to the flexible strap 220. The second segment 228 and the third segment 234 may form a second inflection point 232 where the central load support mechanism 256 attaches to the flexible strap 220. The third segment 234 and the fourth segment 240 may form a third inflection point 238 where the second anchoring mechanism 254 attaches to the flexible strap 220.

As used herein, the term "inflection point" refers to a point on the flexible strap 220 where the flexible strap 220 changes direction. As illustrated in FIG. 1, the first and the second segments 222, 228, considered collectively, may be concave upward; the second and third segments 228, 234, considered collectively, may be concave downward; and the third and fourth segments 234, 240, consider collectively, may be concave upward.

An inflection point on the flexible strap 220 may be created when the flexible strap 220 changes direction. For example, at the first inflection point 226, as the flexible strap 220 passes through the first anchoring mechanism 252 attached to the first headrest column 106, the flexible strap 220 folds back on itself to create a V-like shape.

A longitudinal axis 224 of the first segment 222 may meet the longitudinal axis 230 of the second segment 228 at the first inflection point 226. The longitudinal axis 230 of the second segment 228 may meet the longitudinal axis 236 of the third segment 234 at the second inflection point 232. The longitudinal axis 236 of the third segment 234 may meet the longitudinal axis 242 of the fourth segment 240 at the third inflection point 238. In usage, each of the segments, 222, 228, 234, 240 will, in most cases, not be precisely linear. Accordingly, for purposes of this application, each respective longitudinal axes 224, 230, 236, 242 may extend from a midpoint along the width axis 406 of the beginning of the respective segment 222, 228, 234, 240 to a midpoint along the width axis 406 of the end of the respective segment 222, 228, 234, 240, irrespective of whether each segment 222, 228, 234, 240 is precisely linear.

In various embodiments, in the installed configuration, the longitudinal axis 224 of the first segment 222 may be disposed at an acute angle (an angle less than 90°) with respect to the longitudinal axis 230 of the second segment 228 at the first inflection point 226. The longitudinal axis 230 of the second segment 228 may be disposed at an acute angle with respect to the longitudinal axis 236 of the third segment 234 at the second inflection point 232. The longitudinal axis 236 of the third segment 234 may be disposed at an acute angle with respect to the longitudinal axis 242 of the fourth segment 240 at the third inflection point 238. In the installed configuration, the flexible strap 220 may have an M-like shape with the anchoring mechanisms 252, 254 located above the first attachment point 248, the central load support mechanism 256 and the second attachment point 250 along the height axis 402.

In the installed configuration, the anchoring mechanisms 252, 254 may transfer a load 300 on the central load support mechanism 256 to the headrest columns 106, 108. For example, a load 300 on the central load support mechanism 256 applies a downward force to the flexible strap 220, which may be transmitted through the flexible strap 220 to the first headrest column 106 and the second headrest column 108 via the first anchoring mechanism 252 and the second anchoring mechanism 254, respectively.

Because the flexible strap 220 may be slidably attached to the anchoring mechanisms 252, 254, forces are transmitted through the flexible strap 220 to the first attachment point 248 and the second attachment point 250 of the rear backrest panel 210. Furthermore, because of the angle of the flexible strap 220 at the first attachment point 248 and the second attachment point 250, there may be a resulting vertical force component and a lateral force component at the first attachment point 248 and the second attachment point 250.

The rear backrest panel 210 may cooperate with the upward backrest panel 212, the first lateral backrest panel 214, the second lateral backrest panel 216, and the forward backrest panel 218 to resist the resulting vertical forces and lateral forces applied to the first attachment point 248 and the second attachment point 250. For example, the tension of the installed seat cover 202 may resist movement of the flexible strap 220 at the first attachment point 248 and the second attachment point 250 due to a load 300. It should also be noted that seat cover 202 may be formed of a resilient material that shaped and sized to tightly fit and conform to the seat 100 and, more particularly to the backrest member 102. This tight fit between the seat cover 202 and the seat 100 may provide further support at the first and second attachment points 248, 250.

Referring specifically to FIG. 2, a rear, perspective view illustrates the seat 100 and apparatus 200 of FIG. 1 showing the seat cover 202 in an installed configuration. The apparatus 200 includes a seat cover 202 and a load bearing element 219 (labeled with a reference numeral only in FIG. 1). The seat cover 202 may be installed on a backrest member 102 of the seat 100. The upward backrest panel 212 may have an opening 258 through which the first headrest column 106 passes and another opening 260 through which the second headrest column 108 passes.

The load bearing element 219 may include a flexible strap 220 that is attached to the rear backrest panel 210. It should be noted that the flexible strap 220 may be attached to the rear backrest panel 210 on the interior of the seat cover 202. Therefore, in the installed configuration, the flexible strap 220 may not be visible from the exterior of the seat cover 202, as illustrated in FIG. 2.

A first anchoring mechanism 252 of the load bearing element 219 may pass through the opening 258 on the upward backrest panel 212 and attach to the first headrest column 106. The second anchoring mechanism 254 of the load bearing element 219 may pass through the opening 260 on the upward backrest panel 212 and attach to the second headrest column 108. A central load support mechanism 256 of the load bearing element 219 may pass through an opening 262 on the rear backrest panel 210.

The seat cover 202 may also include one or more positioning straps. In various embodiments, a first positioning strap 264 may circumscribe the rearward-facing backrest member surface 110, the first laterally-facing backrest member surface 114, the forward-facing backrest member surface 118, and the second laterally-facing backrest member surface 116 of the backrest member 102. The first positioning strap 264 may be configured to attach to the rear backrest panel 210 at or near the first attachment point 248 and the second attachment point 250. The first positioning strap 264 may have one or more length adjustment mechanisms (e.g., hook and loop systems, buckles, cinches, clasps, etc.).

A second positioning strap 266 may be configured to attach to the first positioning strap 264. One end of the second positioning strap 266 may attach to the first positioning strap 264 at or near the first attachment point 248. The second positioning strap 266 may pass over the upward-facing backrest member surface 112. The other end of the second positioning strap 266 may attach to the first positioning strap 264 at a location on the forward-facing backrest member surface 118 side of the backrest member 102. The second positioning strap 266 may have one or more length adjustment mechanisms (e.g., hook and loop systems, buckles, cinches, clasps, etc.).

A third positioning strap 268 may be configured to attach to the first positioning strap 264. One end of the third positioning strap 268 may attach to the first positioning strap 264 at or near the second attachment point 250. The third positioning strap 268 may pass over the upward-facing backrest member surface 112. The other end of the third positioning strap 268 may attach to the first positioning strap 264 at a location on the forward-facing backrest member surface 118 side of the backrest member 102. The third positioning strap 268 may have one or more length adjustment mechanisms (e.g., hook and loop systems, buckles, cinches, clasps, etc.).

Figure 3:
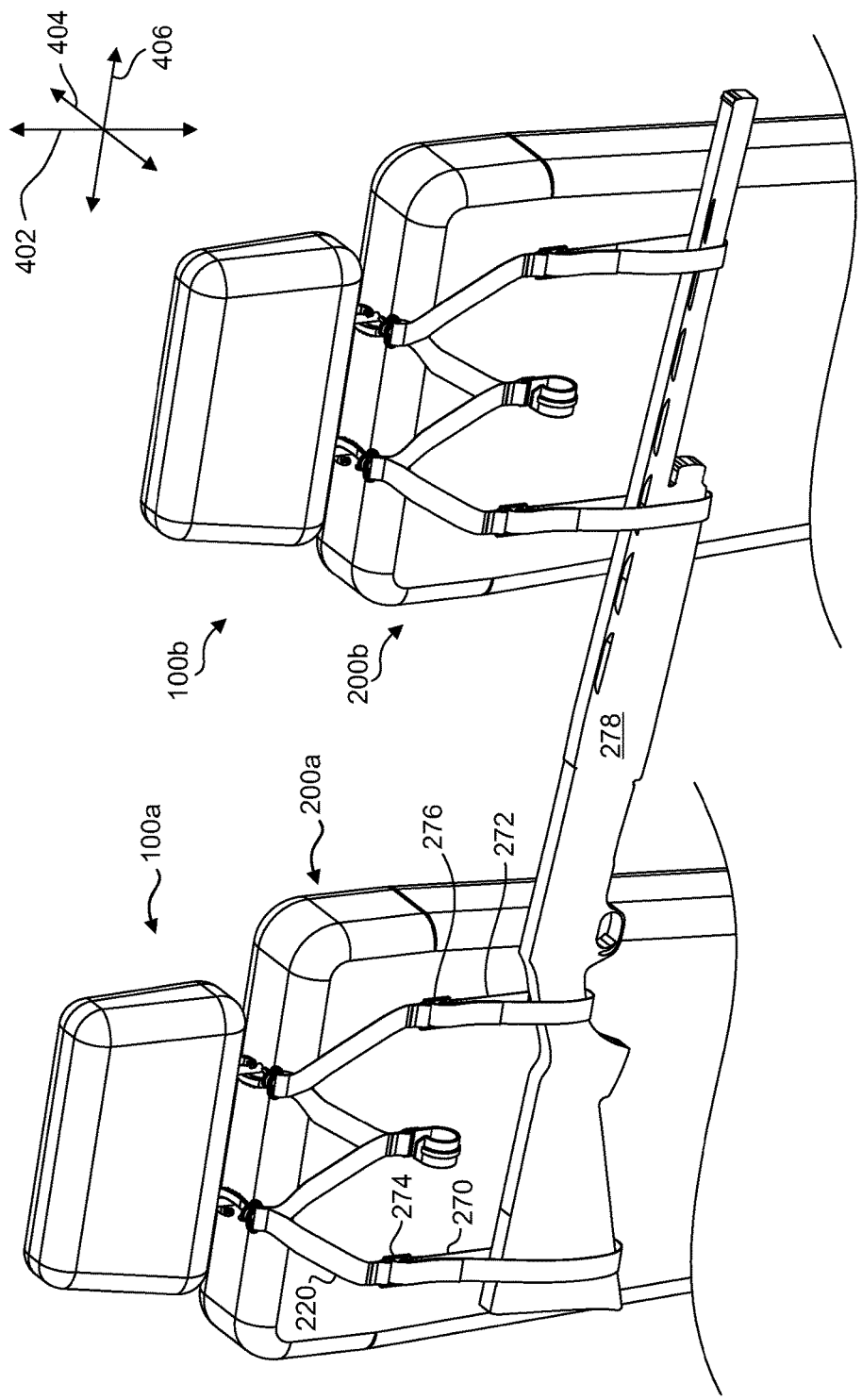
FIG. 3 is a rear, perspective view illustrating two seats each installed with the apparatus of FIG. 1 and FIG. 2.
Figure 4:
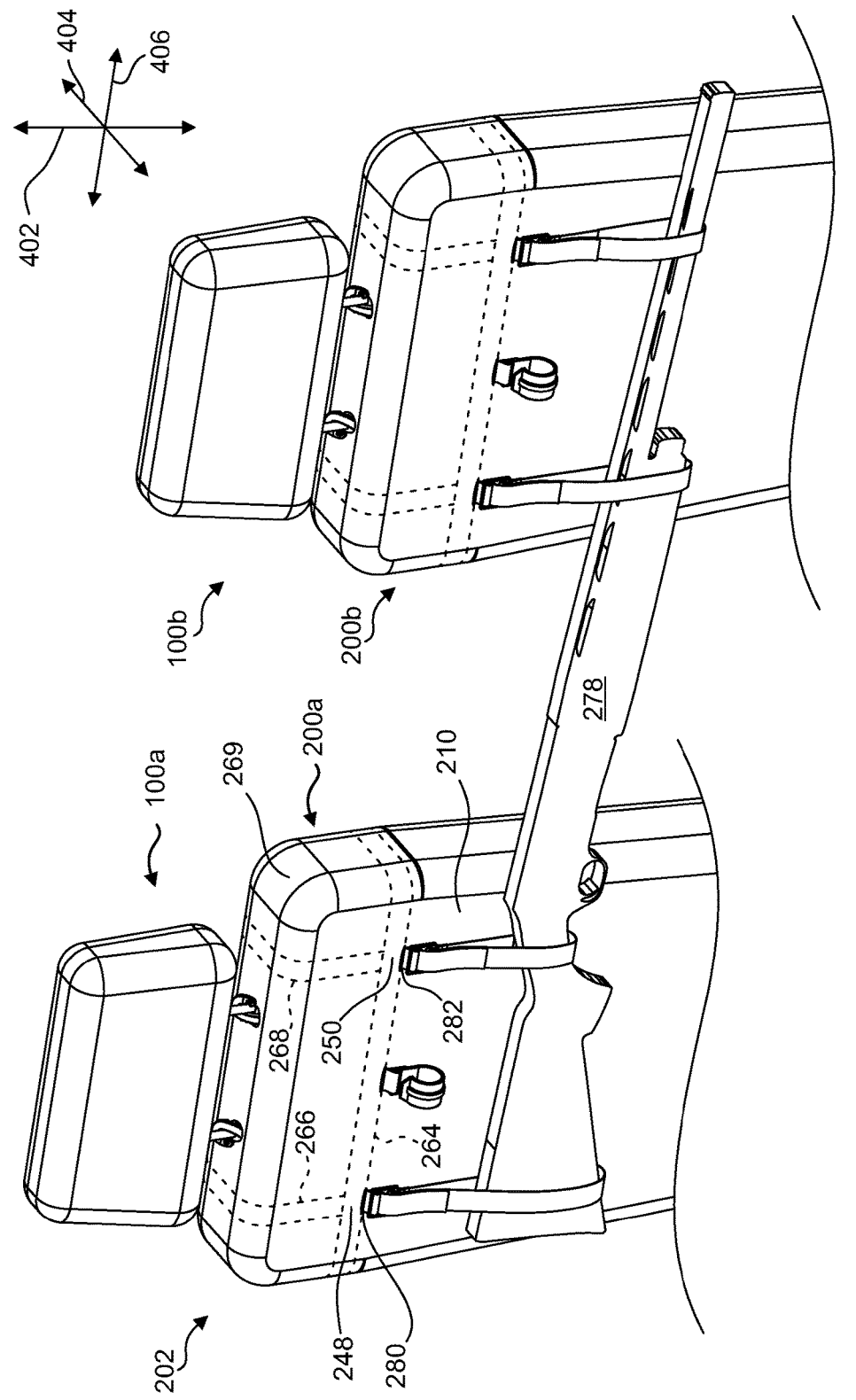
FIG. 4 is another rear, perspective view illustrating two seats each installed with the apparatus of FIG. 1 and FIG. 2.

Referring to FIGS. 3 and 4, a rear, perspective view illustrates two seats 100*a*-*b* each installed with the apparatus 200*a*-*b* of FIG. 1 and FIG. 2, further including peripheral support straps 270, 272. It should be noted that the apparatuses 200*a*-*b* are depicted in FIG. 3 without the seat cover 202 for explanatory purposes, but are depicted with the seat covers 202*a*-*b* in FIG. 4. To avoid the unnecessary repetition of reference numerals, the subcomponents of the seats 100*a*-*b* and apparatuses 200*a*-*b* are labeled with reference numerals only in connection with the first seat 100*a* and the first apparatus 200*a* in FIGS. 3 and 4. As implied, the first and second seats 100*a*-*b* may be identical or mirror images of one another or simply similar. In various alternative embodiments, the first and second seats 100*a*-*b* may be simply different from one another. Likewise, the first and second apparatuses 200*a*-*b* may be identical or mirror images of one another or may simply be similar.

The apparatus 200*a*-*b* may include one or more peripheral support straps attached to the rear backrest panel 210. In various embodiments, a first peripheral support strap 270 may be attached to the rear backrest panel 210 at or near the first attachment point 248. For example, a fastening mechanism 274 (e.g., a tri-glide buckle, loop, ring, etc.) may be attached to the rear backrest panel 210 at or near the first attachment point 248. In the installed configuration, the first peripheral support strap 270 may connect to the fastening mechanism 274.

A second peripheral support strap 272 may be attached to the rear backrest panel 210 at or near the second attachment point 250. For example, a fastening mechanism 276 (e.g., a tri-glide buckle, loop, ring, etc.) may be attached to the rear backrest panel 210 at or near the second attachment point 250. In the installed configuration, the second peripheral support strap 272 may connect to the fastening mechanism 276.

In various embodiments, the first end 244 of the flexible strap 220 may attach to the fastening mechanism 274 at or near the first attachment point 248. The second end 246 of the flexible strap 220 may attach to the fastening mechanism 276 at or near the second attachment point 250. In other words, the same fastening mechanisms 274, 276 used to attach the peripheral support straps 270, 272 to the rear backrest panel 210 may be used to attach the flexible strap 220 to the rear backrest panel 210.

The peripheral support straps 270, 272 may each be a single piece of webbing for the whole strap. For example, the peripheral support straps 270, 272 each may comprise a single strap forming a loop. In various embodiments, the flexible strap 220 and each of the first and second peripheral support straps 270, 272 are made of a single, integral strap. In other words, the flexible strap 220 and each of the first and second peripheral support straps 270, 272 may be integrally formed. In alternative embodiments, the flexible strap 220 and each of the first and second peripheral support straps 270, 272 are made of one or more physically discrete strap portions joined together.

The peripheral support straps 270, 272 may be adjustable in length to accommodate a load 278 distributed between the peripheral support straps 270, 272. For example, a peripheral support strap may include a fastener that can be fastened at one or more locations along the length of the peripheral support strap. Such fasteners may include hook and loop fastening systems, adjustable belts, buckles, clasps, adjustable clips, and the like.

As depicted in FIGS. 3 and 4, the peripheral support straps 270, 272 may have different lengths to accommodate the shape of a load 278 distributed between them. In this example, the load 278 is a firearm (e.g., rifle, shotgun, etc.) that is supported by the two peripheral support straps 270, 272 of a first apparatus 200*a* installed on a first seat 100*a* and the two peripheral support straps 270, 272 of a second apparatus 200*b* installed on a second seat 100*b*.

Referring specifically to FIG. 4, a rear, perspective view illustrates two apparatuses 200*a*-*b* with the seat covers 202*a*-*b* in the installed configuration.

The apparatuses 200*a*-*b* may include one or more peripheral support straps 270, 272 attached to the rear backrest panel 210. As illustrated in FIG. 4, the one or more peripheral support straps 270, 272 may be primarily or entirely disposed on an exterior side of the rear backrest panel 210.

In various embodiments, the rear backrest panel 210 may include an opening 280 at or near the first attachment point 248 for the first peripheral support strap 270 to pass through to an exterior side of the rear backrest panel 210. The rear backrest panel 210 may also include an opening 282 at or near the second attachment point 250 for the second peripheral support strap 272 to pass through to the exterior side of the rear backrest panel 210.

In various alternative embodiments, the rear backrest panel 210 may not have openings 280, 282 associated with the peripheral support straps 270, 272. Rather, the peripheral support straps 270, 272 may be attached to the exterior side of the rear backrest panel 210. For example, fastening mechanisms may be sewn to the exterior of the rear backrest panel 210 at or near the first attachment point 248 and the second attachment point 250.

It should also be noted that the seat covers 202 depicted in FIG. 4 may also comprise one or more positioning straps 264, 266, 268, which are illustrated in FIG. 2.

Referring now collectively to FIGS. 1-4, a first end of the flexible strap 220 may be attached to a first attachment point 248 on the seat cover 202 (in various embodiments, to the rear backrest panel 210), and the second attachment point 250 of the flexible strap 220 may be attached to a second attachment point 250 of the seat cover 202 (in various embodiments, to the rear backrest panel 210). The seat cover 202, as illustrated in FIG. 2, may comprise not only a fabric covering portion 269, but may further comprise one or more positioning straps 264, 266, 268. Accordingly, the first and second attachment points 248, 250 may be on the fabric portion 269 or, additionally or alternatively, may be on one or more of the positioning straps 264, 266, 268. In various embodiments, the seat cover 202 is devoid of a fabric covering portion 269 and comprises only a set of one or more positioning straps 264, 266, 268. Accordingly, the rear backrest panel 210 may comprise a set of one or more positioning straps 264, 266, 268 comprising the first and second attachment point 248, 250.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. An apparatus for covering a seat of a vehicle, comprising:
    a seat cover having an installed configuration, the seat cover comprising:
        a rear backrest panel; and
        an upward backrest panel having one or more openings to permit headrest columns to pass through the upward backrest panel when the seat cover is in the installed configuration; and
    a load bearing element, in the installed configuration, comprising:
        a flexible strap, wherein a first end of the flexible strap attaches to a first attachment point on the rear backrest panel and a second end of the flexible strap attaches to a second attachment point on the rear backrest panel;
        a first anchoring mechanism configured to attach to the flexible strap at a first inflection point between a first segment and a second segment of the flexible strap;
        a central load support mechanism configured to attach to the flexible strap at a second inflection point between the second segment and a third segment of the flexible strap; and
        a second anchoring mechanism configured to attach to the flexible strap at a third inflection point between the third segment and a fourth segment of the flexible strap,
        wherein the first anchoring mechanism attaches to a first headrest column and the second anchoring mechanism attaches to a second headrest column.

2. The apparatus of claim 1, wherein the central load support mechanism comprises a hook.

3. The apparatus of claim 1, wherein, in the installed configuration, the anchoring mechanisms transfer a load on the central load support mechanism to the headrest columns.

4. The apparatus of claim 1, wherein, in the installed configuration:
    a longitudinal axis of the first segment is disposed at an acute angle with respect to a longitudinal axis of the second segment at the first inflection point;
    the longitudinal axis of the second segment is disposed at an acute angle with respect to a longitudinal axis of the third segment at the second inflection point; and
    the longitudinal axis of the third segment is disposed at an acute angle with respect to a longitudinal axis of the fourth segment at the third inflection point.

5. The apparatus of claim 1, wherein, the anchoring mechanisms are slidably attached to the flexible strap.

6. The apparatus of claim 1, wherein the rear backrest panel further comprises a first loop attached at the first attachment point and a second loop attached at the second attachment point, wherein, in the installed configuration, the first end of the flexible strap attaches to the first loop and the second end of the flexible strap attaches to the second loop.

7. The apparatus of claim 1, wherein, in the installed configuration, the flexible strap is attached to the rear backrest panel on an interior side of the rear backrest panel.

8. The apparatus of claim 7, wherein the rear backrest panel further comprises an opening for the central load support mechanism to pass through to an exterior side of the rear backrest panel.

9. The apparatus of claim 1, further comprising a first peripheral support strap attached to the rear backrest panel at the first attachment point and a second peripheral support strap attached to the rear backrest panel at the second attachment point.

10. The apparatus of claim 9, wherein the peripheral support straps each comprise a single strap forming a loop.

11. The apparatus of claim 10, wherein the peripheral support straps are adjustable in length to accommodate a load distributed between the peripheral support straps.

12. The apparatus of claim 9, wherein the rear backrest panel further comprises an opening at the first attachment point for the first peripheral support strap to pass through to an exterior side of the rear backrest panel and an opening at the second attachment point for the second peripheral support strap to pass through to the exterior side of the rear backrest panel.

13. An apparatus for covering a seat of a vehicle, comprising:
    a seat cover having an installed configuration:
    a load bearing element, in the installed configuration, comprising:
        a flexible strap, wherein a first end of the flexible strap attaches to a first attachment point on the seat cover and a second end of the flexible strap attaches to a second attachment point on the seat cover;
        a first anchoring mechanism configured to attach to the flexible strap at a first inflection point between a first segment and a second segment of the flexible strap;
        a central load support mechanism configured to attach to the flexible strap at a second inflection point between the second segment and a third segment of the flexible strap; and
        a second anchoring mechanism configured to attach to the flexible strap at a third inflection point between the third segment and a fourth segment of the flexible strap,
        wherein the first anchoring mechanism attaches to a first headrest column and the second anchoring mechanism attaches to a second headrest column.

* * * * *